(12) United States Patent
Schippl

(10) Patent No.: US 6,883,548 B2
(45) Date of Patent: Apr. 26, 2005

(54) SPACER FOR A LONG SUBSTRATE

(75) Inventor: Klaus Schippl, Hannover (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/798,330

(22) Filed: Mar. 12, 2004

(65) Prior Publication Data

US 2004/0194837 A1 Oct. 7, 2004

(30) Foreign Application Priority Data

Mar. 13, 2003 (DE) .......................................... 103 10 960

(51) Int. Cl.$^7$ ................................................. F16L 9/18
(52) U.S. Cl. ........................ 138/112; 138/148; 138/149; 138/157
(58) Field of Search ................................ 138/108, 112, 138/148, 149, 157

(56) References Cited

U.S. PATENT DOCUMENTS

| | | | | |
|---|---|---|---|---|
| 534,473 A | * | 2/1895 | Harvey ........................ | 138/148 |
| 903,316 A | * | 11/1908 | Reimann ...................... | 285/14 |
| 2,613,166 A | * | 10/1952 | Gronemeyer ............... | 138/147 |
| 2,664,112 A | * | 12/1953 | Isenberg ...................... | 138/113 |
| 3,214,994 A | * | 11/1965 | Tolan, Jr. ..................... | 74/490 |
| 3,595,275 A | * | 7/1971 | Steans et al. ................ | 138/114 |
| 3,756,268 A | * | 9/1973 | Lefever et al. ............. | 137/340 |
| 3,952,777 A | * | 4/1976 | Uhlig .......................... | 138/149 |
| 4,219,224 A | * | 8/1980 | Hanley ........................ | 285/47 |
| 6,000,420 A | * | 12/1999 | Nicholson et al. ........ | 137/15.01 |
| 6,186,181 B1 | * | 2/2001 | Schippl ...................... | 138/112 |
| 6,343,624 B1 | * | 2/2002 | Neumann ................... | 138/149 |
| 6,736,166 B1 | * | 5/2004 | Calais et al. ................ | 138/112 |

FOREIGN PATENT DOCUMENTS

| | | |
|---|---|---|
| DE | 1 650 060 | 8/1970 |
| DE | 2 252 069 | 5/1973 |
| DE | 26 55 420 A1 | 7/1977 |
| DE | 198 46 587 C1 | 3/2000 |
| DE | 100 65 662 A1 | 7/2001 |

* cited by examiner

Primary Examiner—James Hoook
(74) Attorney, Agent, or Firm—Sughrue Mion, PLLC

(57) ABSTRACT

A spacer for a long substrate in the interior of a long tube, with a superinsulation material being disposed between the substrate and the tube. The spacer includes two rings (3, 4) seated on the substrate (1) and spaced apart from each other at a longitudinal axial distance, a tube section (5) supported on the rings (3, 4) and a second ring (6) disposed on the tube section (5). The first rings (3, 4), the tube section (5) and the second ring (6) are made of a material with poor thermal conductivity and high mechanical strength.

9 Claims, 2 Drawing Sheets

SPACER FOR A LONG SUBSTRATE

This application is based on and claims the benefit of German Patent Application No. 103 10 960.9 filed Mar. 13, 2003.

BACKGROUND OF THE INVENTION

The invention relates to a spacer for a long substrate in the interior of a long tube, of the type wherein a superinsulation material is arranged between the substrate and the tube, and to a coaxial tube system with such a spacer.

The invention is based on the following considerations:

Optimal thermal insulation in refrigeration technology is achieved by multi-layer foil insulation in a high vacuum (superinsulation). The total heat flow is brought to what is currently the lowest technically possible value by minimizing the components $Q_{gas}$, $Q_{FK}$ and $Q_{rad}$.

The heat loss flows $Q_{gas}$ are reduced by evacuating the insulation space.

The solid heat bridges, e.g., spacers, which are responsible for $Q_{FK}$, are structurally reduced by minimizing the solid-state contact flows.

The radiation losses $Q_{rad}$ are reduced by metallizing the interior walls or by installing highly reflective foils.

$Q_{FK}$ plays a decisive role, especially in flexible, vacuum-insulated cryogenic conduits. To prevent direct contact at any point along the course of the conduit between the cold interior tube and the exterior tube, which is at room temperature, spacers of various designs have heretofore been used. These spacers must be capable of transmitting the largest possible force component but must likewise have the property of low thermal conductivity. The spacers of the prior art have the drawback that they do not implement these two necessary goals equally well. If low thermal conductivity was achieved, the mechanical loading capacity was low; if high mechanical loading capacity was achieved, very high thermal conductivity had to be accepted.

German publication DE-C2-2 136 176 discloses a tube system consisting of two concentric tubes, e.g., an electrical cable operated at low temperatures or a conduit for transporting liquid or gaseous heated or cooled media, whose interior tube is held in position inside the surrounding exterior tube by spacers, which are made of little material. The spacers are seated at intervals on the interior tube and are supported against the inner surface of the exterior tube. The spacer consists of a plurality of slotted rings, whose slot width corresponds to the diameter of the interior tube. On each ring, a thread element is fastened in the slot area. The rings are interconnected in such a way that they can be pivoted about a common axis of rotation. When the spacer is placed onto the interior tube, the thread elements partially wrap around the interior tube. The exterior tube is supported against the outer circumference of the spacer formed by the rings. This design requires very little material but a relatively large amount of space within the insulation area. Since it is furthermore difficult to fix the thread elements permanently to the rings and the fixation can be loosened under tensile loads, this spacer is less suitable for flexible tube systems where tensile or compression loads of more than 10,000 N may occur during bending.

U.S. Pat. No. 2,914,090 discloses a spacer for a coaxial tube system. The spacers are seated on the interior tube spaced apart from each other at a longitudinal axial distance. They hold the interior tube at a distance from the exterior tube. Each spacer consists of an interior metal tube section enclosing the interior tube and an exterior tube section, which is likewise made of metal and contacts the interior wall of the exterior tube. Between the interior and the exterior tube sections, three spoke-like struts spaced equidistantly across the circumference are provided and welded to both the interior and the exterior tube section. The interior tube section is made of two coaxial tubes between which thermal insulation, e.g., made of asbestos, is inserted.

Although this spacer has great mechanical strength it lacks the necessary insulating properties.

SUMMARY OF THE INVENTION

Thus, an object of the invention is to provide a spacer which is made with little material and consequently has good heat insulating properties and which can withstand high mechanical loads.

This object is attained by a spacer wherein a superinsulation material is arranged between the substrate and the tube, characterized by two first rings (3, 4) seated on the substrate (1) and spaced apart at a longitudinal axial distance from one another, a tube section (5) supported on the rings (3, 4) and a second ring (6) located on the tube section (5), wherein the first rings (3, 4), the tube section (5) and the second ring (6) are made of a material that has poor thermal conductivity but high mechanical strength.

Additional advantageous embodiments of the spacer are set forth in the remaining claims and are described in detail below.

BRIEF DESCRIPTION OF THE DRAWINGS

The invention will now be described in greater detail with reference to the drawings, in which.

DETAILED DESCRIPTION OF THE INVENTION

Figure 1:
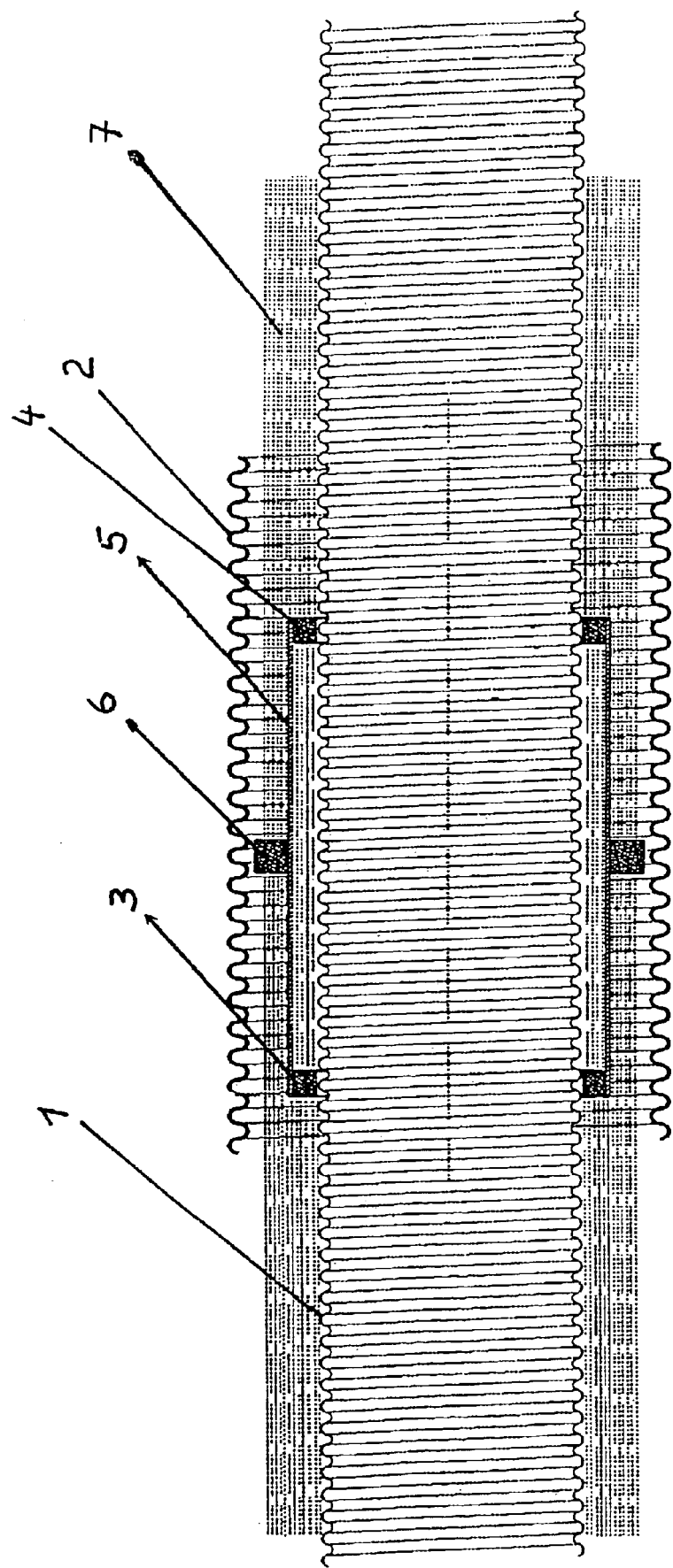
FIG. 1 is a schematic illustration of a tube system according to the invention.

FIG. 1 shows a tube system comprising two conduits arranged concentrically to each other. The tube system is intended, for example, for transporting cryogenic media.

The tube system includes a corrugated interior metal tube 1, which is preferably made of stainless steel, and a likewise corrugated exterior metal tube 2, which is preferably also made of stainless steel. Because of the corrugation of the interior tube 1 and the exterior tube 2, the tube system is flexible and can be wound onto transport reels and thus can be transported to the place of use. If the tubes 1 and 2 are produced by shaping a nearly endless metal strip into a tube with a longitudinal slit, welding the longitudinal slit and subsequently corrugating the tube, it is possible to obtain tubes of nearly endless lengths.

Between the interior tube 1 and the exterior tube 2, spacers are provided at specific intervals in the longitudinal axial direction. These spacers comprise rings 3 and 4 seated on the interior tube 1, a tube section 5 and a ring 6 located between the tube section 5 and the exterior tube 2. The rings 3 and 4 of the tube section 5 and the ring 6 are made of fiber-reinforced plastic, e.g., glass fiber-reinforced epoxy resin.

The spacer can be assembled from parts 3, 4, 5 and 6 and pushed onto the interior tube 1 as a unit.

As an alternative thereto, the spacer produced as a unit can be separated into two parts, such that it can be laterally placed onto the interior tube.

A so-called superinsulation 7 formed of a plurality of layers of metallized plastic foils is placed between the interior tube 1 and the exterior tube 2.

This superinsulation 7 is also provided in the area of the spacer. In an embodiment where the spacer is made of two parts that are laterally placed onto the interior tube 1, the superinsulation is fixed to the interior wall of the tube section 5.

Figure 2:
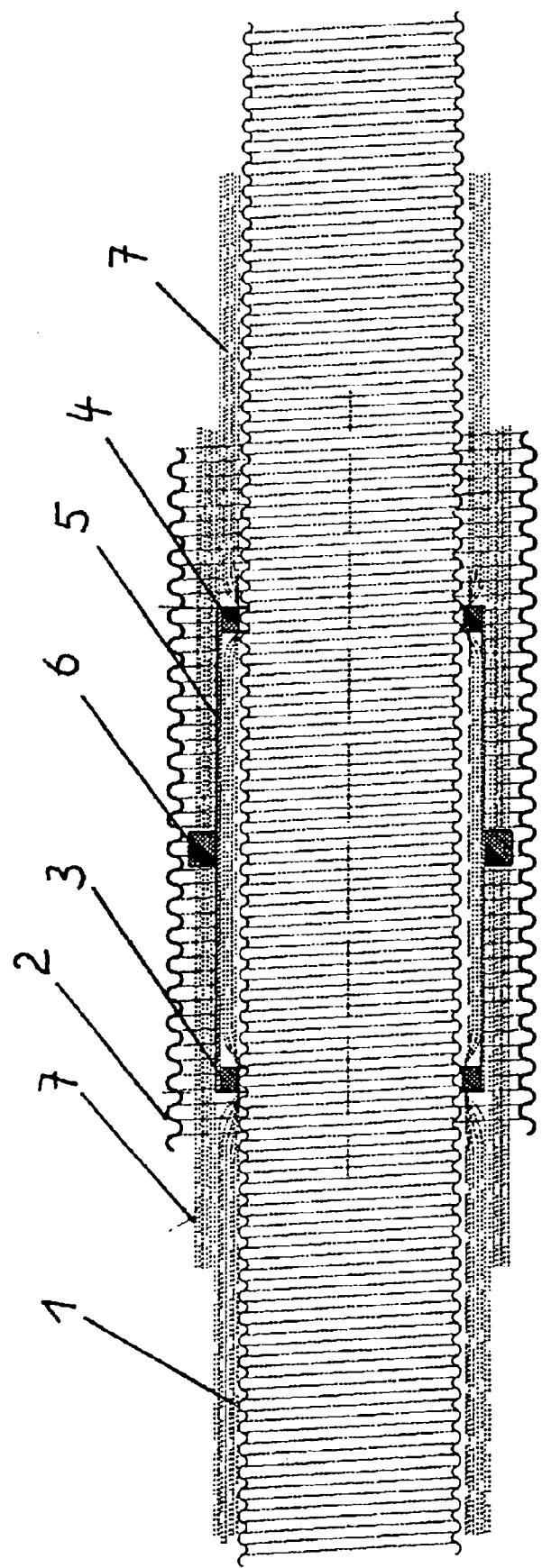
FIG. 2 is a schematic illustration of an alternative embodiment of the invention.

In the embodiment shown in FIG. 2, the superinsulation 7 is first wrapped around the entire length of the interior tube 1. Thereafter, the spacers are placed onto the superinsulation, which is thereby compressed in the area of the rings 3 and 4.

This process is suitable if large tube system lengths are to be produced.

Here, the interior tube 1 is produced first and is wound onto a supply reel. During production of the interior tube 1, the superinsulation 7 can be wound up in the same operation.

In the next working step, the insulated interior tube 1 is pulled off the supply reel and the spacers are placed onto the superinsulation.

A metal strip is pulled from a supply reel and in a continuous operation is shaped into a slit tube around the interior tube 1, the longitudinal seam is welded and the tube is corrugated. A plastic jacket can further be extruded onto the exterior tube 2 thus formed.

At the installation site, the gap between the interior tube and the exterior tube is evacuated.

What is claimed is:

1. A spacer for a long substrate in the interior of a long tube, wherein a superinsulation material is arranged between the substrate and the tube, said spacer comprising two first rings (3, 4) seated on the substrate (1) and spaced apart at a longitudinal axial distance from one another, a tube section (5) supported on the rings (3, 4), the length of the tube section (5) corresponds to 1 to 2 times the outside diameter of the tube (2), and a second ring (6) located on the tube section (5) between the two first rings, wherein the first rings (3, 4), the tube section (5) and the second ring (6) are made of a material that has poor thermal conductivity but high mechanical strength.

2. A spacer as claimed in claim 1, further comprising a superinsulation material (7) between the substrate (1) and the first rings (3, 4).

3. A spacer as claimed in claim 1, wherein the first rings (3, 4), the tube section (5) and the second ring (6) are made of fiber-reinforced plastic.

4. A spacer as claimed in claim 1, further comprising a superinsulation material (7) disposed in the area between the first two rings (3, 4).

5. A spacer as claimed in claim 1, wherein the tube section (5) has a wall thickness of between 0.5 and 2 mm.

6. A spacer as claimed in claim 1, wherein the gap between the tube section (5) and the tube (2) is filled with superinsulation material (7) on both sides of the second ring (6).

7. A spacer as claimed in claim 1, wherein the first rings (3, 4), the tube section (5) and the second ring (6) are made as half shells.

8. A spacer as claimed in claim 7, wherein the half shells, respectively, of the first rings (3, 4) of the tube section (5) and the second ring (6) form a unit.

9. A coaxial tube system for transporting media at very low temperatures using a spacer as claimed in claim 1 comprising a corrugated interior metal tube (1) and a corrugated exterior metal tube (2), wherein the annular space between the interior tube and the exterior tube is evacuated.

* * * * *